United States Patent [19]

Karkouti

[11] Patent Number: 4,893,240
[45] Date of Patent: Jan. 9, 1990

[54] REMOTE CONTROL SYSTEM FOR OPERATING SELECTED FUNCTIONS OF A VEHICLE

[76] Inventor: Imad Karkouti, 8112A Trans Canada Highway, St-Laurent, Quebec H4S 1M5, Canada

[21] Appl. No.: 320,793

[22] Filed: Mar. 9, 1989

Related U.S. Application Data

[63] Continuation of Ser. No. 8,341, Jan. 29, 1987, abandoned.

[51] Int. Cl.$^4$ .............................................. F02N 11/08
[52] U.S. Cl. ............................... 364/424.05; 341/176; 123/179 B; 290/38 C
[58] Field of Search .............. 364/424.05, 550, 424.01; 180/167; 123/179 B; 290/38 R, 38 C, DIG. 3; 340/502, 504, 505, 696; 341/176

[56] References Cited

U.S. PATENT DOCUMENTS

| | | | |
|---|---|---|---|
| Re. 29,525 | 1/1978 | Willmott | 340/696 |
| 3,914,692 | 10/1975 | Seaborn, Jr. | 340/502 |
| 4,236,594 | 12/1980 | Ramsperger | 180/167 |
| 4,334,221 | 6/1982 | Rosenhagen et al. | 340/696 |
| 4,413,261 | 11/1983 | Greenberg | 290/38 C |
| 4,529,980 | 7/1985 | Liotine et al. | 340/696 |
| 4,577,599 | 3/1986 | Chmielewski | 123/179 B |
| 4,637,359 | 1/1987 | Cook | 290/38 C |
| 4,674,454 | 6/1987 | Phairr | 123/179 B |

Primary Examiner—Gary Chin
Attorney, Agent, or Firm—Oblon, Spivak, McClelland, Maier & Neustadt

[57] ABSTRACT

The present invention relates to a remote control system and a method of remotely operating selected functions of a vehicle that is operated by an engine. The system comprises a remote control unit and a vehicle operation unit. The remote control unit has a keyboard for selecting a personal code and also for selecting one or more function codes which are designed to be executed by the vehicle operation unit. An encoding circuit generates a code which corresponds to the personal code and a function code. A transmitter is provided with the remote control unit for transmitting signal codes. The vehicle operation unit has a receiver and a decoder for receiving an verifying the personal code and the function code. A processing unit is provided with the vehicle operation unit to process the codes and to operate interface circuits which operate functions of the vehicle corresponding to the function code. A coding and transmitting circuit is also provided with the vehicle operation unit for transmitting to the control unit a confirmation signal to confirm that the selected function by the control unit have been executed and is operational.

8 Claims, 2 Drawing Sheets

REMOTE CONTROL SYSTEM FOR OPERATING SELECTED FUNCTIONS OF A VEHICLE

This application is a continuation of application Ser. No. 008,341 filed on Jan. 29, 1987, now abandoned.

BACKGROUND OF INVENTION:

1. Field of Invention

The present invention relates to a remote control system for operating selected functions in a vehicle which is operated by an engine and particularly to a control system capable of generating a personal code signal followed by one or more function codes and wherein a vehicle operation unit identifies the personal code in order to make its unit operable and then transmits signals to the control unit to identify that the unit is synchronized and that selected functions by the control unit have been executed and are operational.

2. Description of Prior Art

Various remote control systems for starting motor vehicles are known. As an example only, some are described in U.S. Pat. Nos. 3,811,049 issued on May 14, 1974; 3,577,164 issued on May 4, 1971; and 3,078,384 issued on Feb. 26, 1963. Also, some of these patents describe systems for starting automobile engines as well as for permitting warming or cooling of the automobile interior before occupancy by the operator. However, none of these systems have any safety features to prevent intrusion into the vehicle once it has been started or to assure that the vehicle has not been started by the reception of a transient signal that may have been generated from another source in the vicinity of the starting circuit. Still further, none of these starting circuits communicate back to the remote control module to advise it of the reception of the starting signal or of the proper operation of the functions to be performed by the automatic starting circuit and associated function circuits.

SUMMARY OF INVENTION:

It is a feature of the present invention to provide an improved remote control system for operating selected functions of a vehicle and wherein the remote control unit and the vehicle operation unit are synchronized by a personal coded signal to prevent false operation of the vehicle operation unit.

Another feature of the present invention is to provide an improved remote control system for operating selected functions of a vehicle and wherein the vehicle operation unit transmits to the remote control unit a confirmation signal that the vehicle operation unit is operable to receive function signals.

Another feature of the present invention is to provide an improved remote control system for operating selected functions of a vehicle and wherein the vehicle operation unit transmits function operation signals to the control unit to identify that selected functions have been executed and are operational.

Another feature of the present invention is to provide an improved method of remotely operating selected functions of a vehicle operated by an engine and wherein there is provided a remote control unit and a vehicle operation unit and wherein the vehicle operation unit is operable only upon identifying a personal code and further wherein the vehicle operation unit is capable of generating a confirmation signal of the reception of a personal code and generating confirmation signals of the operation of various functions commanded by the remote control unit.

According to the above features, from a broad aspect, the present invention provides a remote control system for operating selected functions in a vehicle operated by an engine. The system comprises a remote control unit and a vehicle operation unit. The remote control unit has a keyboard for selecting a personal code and one or more function codes to be executed by the vehicle operation unit. Encoding circuit means is provided for generating a code corresponding to the personal code and a function code A transmitter is provided for transmitting these codes. The vehicle operation unit has a receiver and a decoder for receiving and verifying the personal code and the function code. A processing circuit is further provided in the vehicle operation unit for processing the codes and operating interface circuits corresponding to the function code. The vehicle operation unit also has a coding and transmitting circuit for transmitting to the control unit a confirmation signal to confirm that the selected function by the control unit has been executed and is operational.

According to another broad aspect of the present invention there is provided a method of remotely operating selected functions of a vehicle operated by an engine and wherein there is provided a remote control unit and a vehicle operation unit. The method comprises the steps of programming both the control unit and the vehicle operation unit to a common personal code signal. This programming is done by placing the vehicle operation unit to a manual mode. The control unit is then placed to a program mode and keys are then depressed on its keyboard which correspond to a desired "personal" code, and "KEY" is then depressed on the keyboard to complete the programming. A desired function key is then depressed on the control unit to generate a transmission coded signal comprising the personal code followed by the selected function code. This transmitted coded signal is received in a receiver of the vehicle operation unit which effects an operation corresponding to a code of the function key after matching the personal code. The vehicle operation unit then transmits a function operation signal to the remote control unit to confirm that the selected function has been executed and is operational.

BRIEF DESCRIPTION OF DRAWINGS:

A preferred embodiment of the present invention will now be described with reference to the accompanying drawings in which.

DESCRIPTION OF PREFERRED EMBODIMENTS:

It is pointed out that details of the construction of the blocks in the system representative of various circuits or interface linkages, etc. are not disclosed herein as they are standard state of the art circuits and mechanics. The present invention resides in the arrangement of the system circuits and the method of operation of the remote control system for operating selected functions of a vehicle, such as an automotive road vehicle, a boat, or any other vehicle that is operated by an internal combustion or electric engine, and wherein it is desirable to pre-start the engine of the vehicle and other functions associated with the vehicle.

Figure 1:
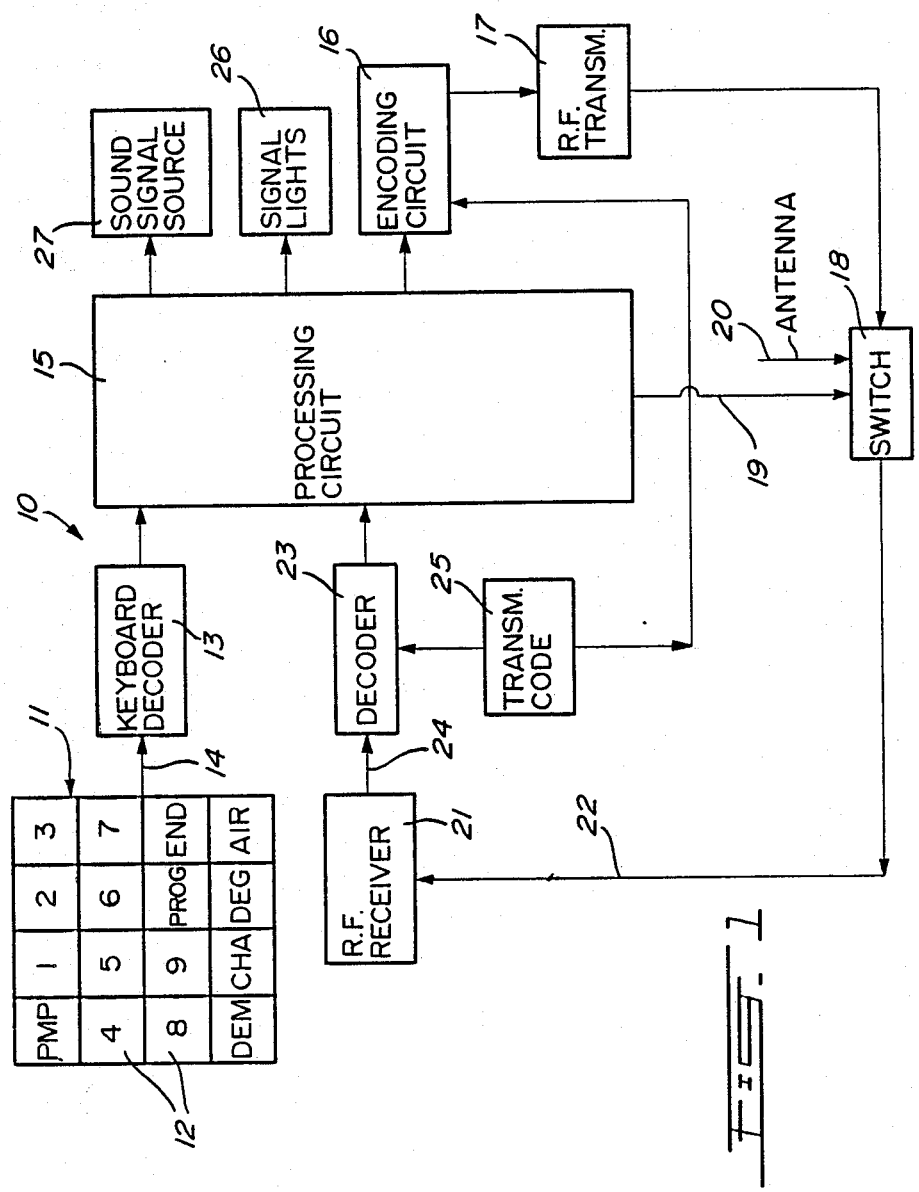
FIG. 1 is a block diagram showing the construction of the remote control units.
Figure 2:
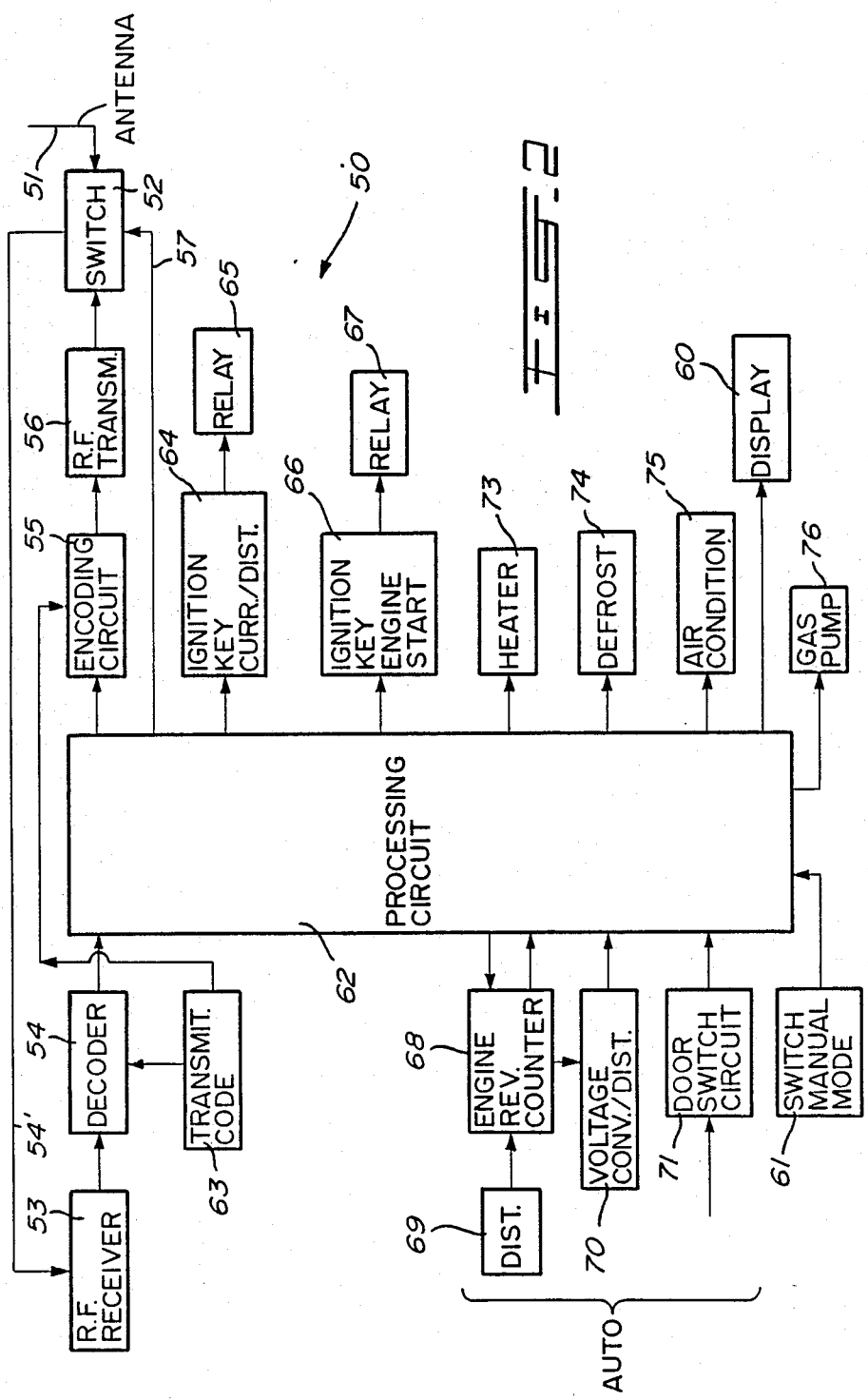
FIG. 2 is a block diagram showing the construction of the vehicle operation unit.

Referring now to FIG. 1 there is shown the construction of the remote control unit 10. As herein shown, the remote control unit 10 comprises a keyboard 11 having a plurality of keys 12. Nine of these keys 12 are provided with numbers 1, 2, 3, 4, 5, 6, 7, 8, 9, whereby to punch in a personal code to properly identify or address the vehicle operation unit 50, as shown in FIG. 2. The unit 50 is a slave unit.

The keyboard 11 also is provided with seven other keys whereby to command seven functions of the vehicle (not shown). A first of these keys is identified as "PROG". The purpose of this key is to program the vehicle operation unit 50 (see FIG. 2) with the personal code whereby both units may be synchronized with one another and permit the vehicle operation unit to operate only once this personal code has been received and identified. An END key is provided to terminate the programming function. The PMP key is provided to operate the gas pump in the vehicle during engine start-up or during operation of the engine. The DEM key is to initiate the engine starting function. The CHA key is to initiate the starting of the vehicle heater. The DEG key is to initiate the start-up of the defrost equipment in the vehicle, and the AIR key is to operate the air conditioning system of the vehicle. By depressing any of the keys in the keyboard 11 the signals are decoded in a keyboard decoder 13 which is connected to the output 14 of the keyboard and fed to a processing unit 15 where the decoded signals are processed in order and connected to an encoding circuit 16. The encoding circuit 16 codes these information signals and feeds them to an RF transmitter 17 which transmits them through a switch circuit 18. The switch circuit 18 is also connected to an output 19 of the processing unit which conditions the switch 18 to connect the RF transmitter to the antenna 20 for the transmission of the coded signals whereby to operate the vehicle operation unit 50 to perform the specific function.

As pointed out, initially it is necessary to program both the control unit 10 and the vehicle operation unit 50 to a common personal code whereby the vehicle operation unit 50 can only be placed in an operation mode after detecting the correct personal code signal. This is done as follows with the remote control unit 10 being placed next to the vehicle operation unit 50 for visual contact of a numerical display window 60 on the vehicle operation unit (see FIG. 2). Firstly, the switch 61 of unit 50 is placed in the manual mode. Then the PROG key 12 is depressed on the keyboard 11 of the various numbered keys, for example, eight of these keys for an eight digit code. This code is then stored in a transmit code circuit 63 and at the same time is displayed on the display 60 for verification by the operator. It is pointed out that each time a key is depressed a "BEEP" signal is transmitted by the vehicle operation unit and generated in the control unit. If this "BEEP" signal is not received, then the "PROG" key is depressed again and the sequence repeated from the beginning. Once the programming is completed the END key is depressed and another "BEEP" signal is received indicating that the programming of the personal code is completed. The END key is utilized to shut down the remote conrol unit after any operation.

In normal operation, when it is necessary to start the engine of an automotive vehicle (not shown), in which the vehicle operation unit has been connected, it is firstly necessary to depress the "DEM" key. This automatically transmits the personal code followed by the "DEM" code. This coded signal is transmitted and received by the antenna 51 of the vehicle operation unit 50. Switch 52 directs the signal to an RF receiver 53 via connection 54'. Decoder 54 decodes the signal which is demodulated in the receiver 53 and feeds it to the processing unit 62 which then feeds the signal to a coding circuit 55 where the personal code in the circuit 63 is compared therewith. If both personal codes match, the processing circuit operates the command function and after this is done it sends a confirmation signal to an RF transmitter 56 and the processing unit operates the switch 52 via its connection 57 to connect the antenna 51 to the RF transmitter. This confirmation signal includes the personal code and a function code. This signal is then received at the antenna 20 of the remote control unit 10 with its switch 18 having been placed in a receive mode and the confirmation signal is directed to an RF receiver 21 through the connection 22. The receiver connects the confirmation signal to a decoder 23. This confirmation signal is the same personal key signal that was received and compared in the vehicle operation unit, and it is again compared in the decoder with the personal code signal stored in the transmit code circuit 25. The processing unit 15 recognizes that the codes match and operates a lamp (not shown) in the signal lights circuit 26. A sound signal source 27 is also connected to the processing unit for generating the "BEEP" signal, as hereinabove described.

With the remote control unit now in an operation mode, it is possible to command the vehicle operation unit 50 to operate various functions. Usually the first function to be operated is the DEM function and by depressing the DEM key on the keyboard 11, a specific function operation signal is processed by the processing unit, coded in the circuit 16, and transmitted to the vehicle operation unit 50. This signal is received in the RF receiver 53 of the vehicle operation unit, decoded, and through the processing unit 62 operates a first interface circuit 64 which distributes current from the electrical system of the vehicle to the required equipment to be operated. The interface circuit 64 operates a relay 65 as is usually done by the first position of the ignition key of a vehicle. The signal also operates a second interface circuit 66 for starting the engine. It also operates a relay 67 as is usually done by the ignition key of a vehicle when completely turned. After the engine has been started the processing unit will generate other signals indicating that the engine is operational. If the engine has not been started after a predetermined time, i.e., 10 seconds, the processing circuit 62 will generate a signal indicating that the engine did not start. The control unit can then repeat the signal. It is pointed out that if it is necessary to shut off the engine after it has been started, by depressing the DEM key the electric system of the vehicle is cut off and the engine is stopped.

Referring again to FIG. 2 it can be seen that an engine revolution counter interface circuit 68 is also provided and connected to the processing unit 62. This interface circuit is utilized in the starting mode of the engine and detects the rotational speed of the engine. When the rotational speed reaches a certain number of turns per second, as detected by the frequency in the distributor 29, the processing unit and transmitter 56 generates a signal to the control unit 10 advising it that the engine has started and that the engine starting relay 67 should be released. Also, after the engine has been started the voltage converter/distributor circuit 70 is placed in operation whereby to detect the continuing operation of the engine. If the engine stops, the processing circuit 62 again operates the transmitter 56 to transmit a signal to advise the control unit 10 of the "stop" condition of the engine.

A door switch interface circuit 71 is also placed into operation at the same time as the interface circuit 70 or when the engine is started, and it connects door switches (not shown) associated with each door of the vehicle to the processing unit. If any door is open, the processing unit will cut off the current distribution and shut off the engine. This also sends a signal to the remote control unit indicating that the engine is not operating. Thus, this safety system safeguards against intrusion in the vehicle while it is operated without an operator inside and thereby prevents theft.

The keys marked "CHA", "DEG" and "AIR" operate the corresponding interface circuits 73, 74 and 75 to start the heating system in the vehicle, the defrosting system, and the air conditioning system, respectively. The PMP key operates the accelerator pedal through the gas pump interface circuit 76. These functions can only operate if the "DEM" function is operating.

The processing circuit 62 is also equipped with a timer (not shown) and shuts off all the operating functions of the vehicle. This is done for added security should entry to the vehicle be effected other than by the doors.

It is within the ambit of the present invention to cover any obvious modifications of the preferred example or the system described herein, provided such modifications fall within the scope of the appended claims.

I claim:

1. A remote control system for operating selected functions in a vehicle operated by an engine, said system comprising a portable remote control unit, a vehicle operation unit associated with the electrical and mechanical systems of said vehicle, said remote control unit having a keyboard for programming a personal code therein and selecting a personal code and one or more function codes to be transmitted and executed by said vehicle operation unit, an encoder in said control unit to encode said personal code with one or more function codes prior to the transmission of an encoded signal by an RF transmitter contained in said control unit through a switching device, said operation unit having a receiver and a decoder for receiving and decoding said encoded signal and storing said personal code signal generated by said control unit and a code comparison program in a processing circuit for verifying said personal code and for performing command functions as determined by said one or more function codes, encoding circuit means for generating encoded signals corresponding to said received personal code and said selected one or more function codes to indicate that said operation unit is operational or not, a transmitter for transmitting said encoded signals, said decoder also verifying said personal code and said selected one or more function codes, said processing circuit is further provided in said vehicle operation unit for processing said selected one or more function codes and operating an interface circuit corresponding to said function code, said vehicle operation unit also having a coding and transmitting circuit for transmitting to said control unit a confirmation signal to confirm that said personal code has been matched and that it is ready to receive one or more function code signals by said control unit, said control unit being provided with a receiver circuit and a decoder for receiving said confirmation signal and an operational signal indicative of the operation of the selected one or more function codes and verifying if said operation unit has accepted said personal code and effected said one or more function codes, display means on said control unit to display the acceptance of said confirmation signal and selected one or more function codes by said operation unit, said remote control unit and said vehicle operation unit each being provided with an output switching circuit which is automatically placed in a transmit or receive mode by its respective unit, one of said selected function codes being an engine starting function code for starting said engine, said starting function code generating a starting function signal which operates two interface circuits, a first of said two interface circuits being operated to distribute current to selected electrical equipment to be operated in the vehicle, and a second interface circuit being operated for starting said engine, each said first and second interface circuits being associated with a relay coil for the operation thereof, a third interface circuit for detecting the operation of said engine of said vehicle, said third interface circuit sensing the frequency of a distributor associated with said engine, said third interface circuit being connected to said processing circuit of said vehicle operation unit and effecting the transmission of a function operation signal upon detection of said frequency to indicate to said control unit that said engine is properly operating, said processing circuit automatically monitors said engine by detection of the revolutions of said distributor provided by a revolution counter.

2. A remote control system as claimed in claim 1 wherein said keyboard is provided with a plurality of numerical keys to select said personal code, a "PROG" key to program said vehicle operation unit with said personal code, an "END" key to terminate a programming function, and a plurality of function keys to operate selected functions of said vehicle operation unit.

3. A remote control system as claimed in claim 1 wherein there is further provided a fourth interface circuit for monitoring a voltage converter associated with said engine, said fourth interface circuit also being connected to said processing circuit to effect the transmission of a second function operation signal to indicate to said control unit that said engine has ceased operation upon detection of the disappearance of said frequency.

4. A remote control system as claimed in claim 3 wherein there is further provided a fifth interface circuit for operating a gas pump associated with said engine to increase the rotational speed of said engine.

5. A remote control system as claimed in claim 1 wherein another of said function codes is associated with an air conditioning interface circuit for operating an air conditioning switch of said vehicle, said air conditioning interface circuit also being connected to said processing circuit and effecting the transmission of a function operation signal when sensing the operation of said air conditioning switch to indicate to said control unit that said air conditioning system is operational.

6. A remote control system as claimed in claim 1 wherein another of said function codes is associated with a windshield defrost interface circuit for operating a starting switch to operate a defrost circuit, said defrost interface circuit also being connected to said processing circuit and effecting the transmission of a function operation signal when sensing the operation of said starting switch to indicate to said control unit that said defrost circuit is operational.

7. A remote control system as claimed in claim 1 wherein another of said function codes is associated with a heater interface circuit for operating a starting switch of a heater device, said heater interface circuit also being connected to said processing circuit and effecting the transmission of a function operation signal when sensing the operation of said starting switch to indicate to said control unit that said heater device is operational.

8. A remote control system as claimed in claim 1 wherein another of said function codes is associated with a door switch interface circuit for detecting an open door condition a door switch is provided to cut off the current distribution to stop the engine when an associated vehicle door is opened.

* * * * *